United States Patent
Persson et al.

(10) Patent No.: US 7,386,781 B2
(45) Date of Patent: Jun. 10, 2008

(54) METHOD AND APPARATUS FOR INCREASING THE EFFECTIVE RANGE OF A COMMUNICATION LINK IN A WIRELESS COMMUNICATION SYSTEM

(75) Inventors: Lars Johan Persson, Palo Alto, CA (US); Athanasios A. Kasapi, San Francisco, CA (US)

(73) Assignee: ArrayComm, LLC, San Jose, CA (US)

(*) Notice: Subject to any disclaimer, the term of this patent is extended or adjusted under 35 U.S.C. 154(b) by 655 days.

(21) Appl. No.: 09/817,731

(22) Filed: Mar. 26, 2001

(65) Prior Publication Data

US 2002/0166097 A1 Nov. 7, 2002

Related U.S. Application Data

(60) Provisional application No. 60/255,872, filed on Dec. 15, 2000.

(51) Int. Cl.
*H04L 1/02* (2006.01)
*H04L 1/12* (2006.01)

(52) U.S. Cl. .................. 714/822; 375/267; 375/299

(58) Field of Classification Search ............... 714/822, 714/819, 821, 820, 25, 43, 799, 704, 776; 705/1; 375/259; 455/562.1, 69, 425, 450; 370/310
See application file for complete search history.

(56) References Cited

U.S. PATENT DOCUMENTS

| | | | |
|---|---|---|---|
| 3,195,049 A * | 7/1965 | Altman et al. | 455/139 |
| 3,361,970 A * | 1/1968 | Magnuski | 455/506 |
| 5,369,412 A * | 11/1994 | Tsujimoto | 342/380 |
| 5,461,646 A * | 10/1995 | Anvari | 375/347 |
| 5,663,990 A * | 9/1997 | Bolgiano et al. | 375/138 |
| 5,722,051 A * | 2/1998 | Agrawal et al. | 455/69 |
| 5,790,070 A * | 8/1998 | Natarajan et al. | 342/354 |
| 5,819,174 A * | 10/1998 | Kyllonen | 455/425 |
| 5,881,105 A * | 3/1999 | Balachandran et al. | 375/259 |
| 6,044,349 A * | 3/2000 | Tolopka et al. | 705/1 |
| 6,052,594 A * | 4/2000 | Chuang et al. | 455/450 |
| 6,170,075 B1 * | 1/2001 | Schuster et al. | 714/776 |
| 6,356,528 B1 * | 3/2002 | Lundby et al. | 370/209 |
| 6,591,382 B1 * | 7/2003 | Molloy et al. | 714/704 |
| 6,643,494 B1 * | 11/2003 | Worthy | 455/2.01 |
| 6,694,155 B1 * | 2/2004 | Chin et al. | 455/562.1 |
| 2002/0089966 A1 * | 7/2002 | Bolgiano et al. | 370/342 |
| 2002/0114288 A1 * | 8/2002 | Soliman | 370/310 |
| 2002/0141508 A1 * | 10/2002 | El-Gamal et al. | 375/267 |

OTHER PUBLICATIONS

Naguib et al., Increasing data rate over wireless channels, May 2000, IEEE Signal Processing Magazine, vol. 17, Issue: 3, pp. 76-92.*

* cited by examiner

*Primary Examiner*—Jacques Louis-Jacques
*Assistant Examiner*—Dipakkumar Gandhi
(74) *Attorney, Agent, or Firm*—Blakely Sokoloff Taylor & Zafman LLP

(57) ABSTRACT

A method is presented comprising identifying a weak component in a wireless communication link, instructing a transmitter of the weak component to invoke repetition coding, and selectively combining signals received via multiple antennae on multiple channels to recover information contained in the transmitted signal.

31 Claims, 5 Drawing Sheets

METHOD AND APPARATUS FOR INCREASING THE EFFECTIVE RANGE OF A COMMUNICATION LINK IN A WIRELESS COMMUNICATION SYSTEM

PRIORITY

This non-provisional application claims priority to provisional application No. 60/255,872 entitled Space, Time and Frequency Diversity in the Personal Handyphone System filed by Johan Persson, et al. on Dec. 15, 2000, and commonly assigned to the assignee of this application.

TECHNICAL FIELD

This invention generally relates to wireless communication systems and, more particularly, to a method and apparatus for increasing the effective range of a communication link in a wireless communication channel.

BACKGROUND

Wireless communication systems are not new. Indeed, two-way radio technology dates back to the beginning of the $20^{th}$ century, while its progeny, cellular telephony systems, were first introduced in the early 70's. As the technology developed and the cost associated with owning and using a cellular telephone decreased, the popularity of the wireless telephony systems exploded. To accommodate this growth in the subscriber base, digital cellular techniques were developed and standardized to increase user capacity of the cellular system without a commensurate increase in the radio frequency (RF) power generated within the system.

A number of different digital wireless communication technologies have been introduced and provide the basis for a number of wireless communication system architectures. Two primary examples of digital wireless technology are the time-division multiple access (TDMA) and code-division multiple access (CDMA) technologies. In a TDMA system, a carrier frequency is parsed into independent incremental units of time, referred to as a timeslot, wherein each timeslot at a carrier frequency supports an independent communication session between a subscriber unit (or, handset) and a communication station (or, base station). That is, while a communication channel in a conventional analog communication system is commonly defined by its carrier frequency (i.e., a frequency division multiple access (FDMA) system), a communication channel in a TDMA system is defined by a timeslot on a particular carrier frequency. Carving a given carrier frequency into N-independent timeslots results in an N-fold increase in system capacity over traditional FDMA system, with only a nominal increase in radiated power. In practice, an increase in capacity of two- to eight-fold has been achieved.

In a CDMA system, a communication channel is defined by a pseudo-noise (PN) code contained in the header of digital communication packets passed between the subscriber unit and the communication station. To further enhance system capacity, the CDMA system is a spread-spectrum system wherein the communication channel (defined by the PN code) hops through any of a number of carrier frequencies over an assigned band of radio frequency (or higher) spectrum.

While the introduction of such digital cellular techniques have certainly increased system capacity, developers of wireless communication system equipment continue to introduce enhancements designed to increase capacity and improve system performance. An example of such a development is the use of antenna arrays and, more particularly, the development and implementation of smart antenna technology. Antenna arrays introduce what is commonly referred to as spatial diversity, wherein each antenna in the array effectively provides a signal which is not correlated with the signals provided by other antenna in the array. These decorrelated (i.e., not fully correlated, as opposed to [completely] uncorrelated) signals provide the receiver with a number of alternative signals, each a decorrelated representation of the transmitted signal, from which the strongest is selected for downconversion and baseband recovery. On its own, diversity in the spatial domain provides multiple transmit and receive paths that serve to enhance both the uplink and downlink components of a wireless communication link. Smart antenna systems such as, for example, the Intelli-Cell® smart antenna technology offered by ArrayComm, Inc. of San Jose, Calif., provides further enhancements to the spatial diversity offered by an antenna array to further improve system performance characteristics. On the downlink side (from the communication station to the subscriber unit), spatial diversity facilitates improved directionality of the transmitted signal, which serves to extend the range of the downlink component without increasing power and reducing co-channel interference in the system. On the uplink side, the multiple antennas provide the receiver with a commensurate number of receive signals from which to choose.

Despite the introduction of spatial diversity, and the benefits to be gained from implementations of spatial diversity, many system operators still believe that their system coverage is constrained by the uplink component. While the improved directionality of the downlink component provided by smart antenna techniques may serve to increase the effective downlink range of the communication link, increasing the downlink component alone does not extend the effective range of the entire communication link. That is, it does not matter that the communication station is powerful enough to reach the subscriber unit if the uplink component cannot reach the communication station. Colloquially stated, the wireless communication channel is only as strong as its weakest link. If the communication channel is limited by its uplink component, increasing the strength of the downlink does not solve any problems.

Thus, a method and apparatus for extending the effective range of a communication link in a wireless communication system is required, unencumbered by the deficiencies and limitations commonly associated with the prior art. Just such a solution is presented, below.

SUMMARY

A method and apparatus for extending the effective range of a communication link in a wireless communication system is presented. In accordance with a first embodiment of the present invention, a method is presented comprising identifying the existence of a weak component in a wireless communication link, instructing a transmitter of the weak component to invoke repetition coding, and selectively combining the signals received via multiple antennae on multiple channels to recover information contained in the transmitted signal. According to one example implementation, selective combining of the multiple signals is performed in two stages, wherein at least the second stage implements Maximal Ratio Combining (MRC) to beneficially utilize the signal energy of the multiple channels in recovering the transmitted information. Those skilled in the art will appreciate that by selectively combining a number of signals decorrelated in one or more of the space, time and/or frequency domains increases the effective signal strength of the received signal, thereby increasing the effective range of such signal.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION

This invention concerns a method and apparatus for increasing the effective range of one or more communication link elements of a wireless communication link through selective introduction of diversity in one or more of the space, time and/or frequency domains. According to one aspect of the present invention, the disclosed system selectively employs repetition coding to redundantly transmit information, e.g., conversational content, over multiple channels (e.g., multiple timeslots) to a receiving station. In accordance with another aspect of the present invention, the receiver selectively combines a number of received signals that are decorrelated in one or more of the space, time and/or frequency domains to increase the effective signal strength of the received signal, extending the effective range of the wireless communication link component associated with the received signal(s). In this regard, a multi-dimensional diversity agent is introduced to control one or more elements of the wireless communication system to selectively introduce diversity in one or more of the time and frequency domains, and to selectively combine otherwise decorrelated signals to improve the effective signal strength of the received signal when a weak communication link component is identified.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

EXAMPLE COMMUNICATION SYSTEM

Figure 1:
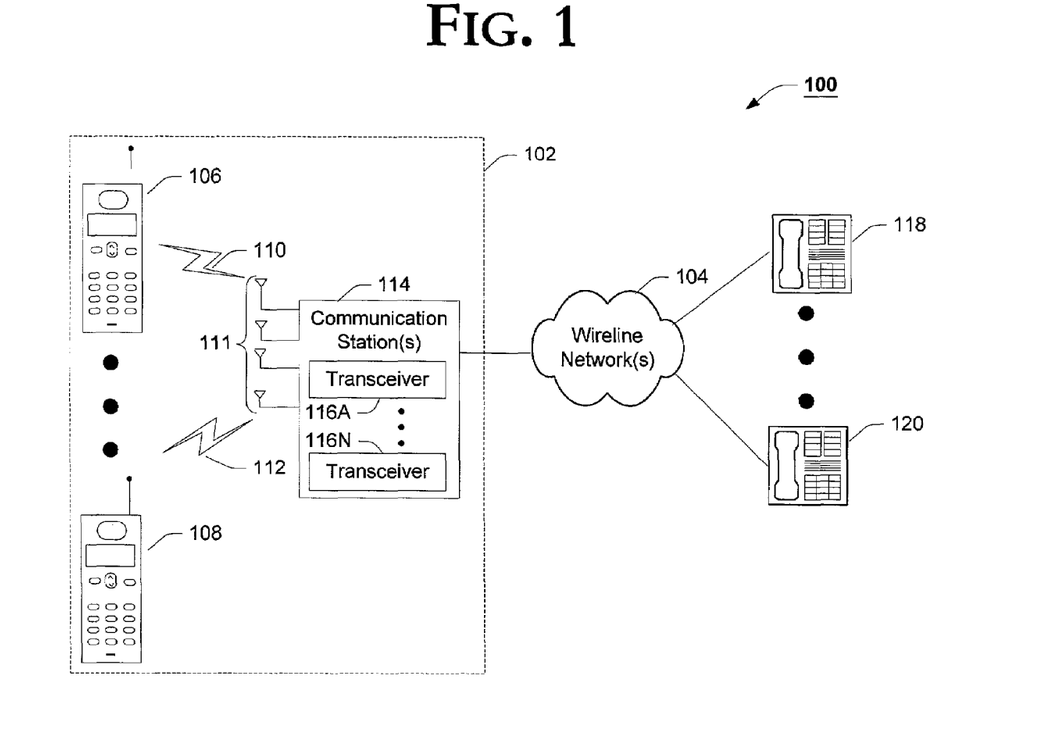
FIG. 1 is a block diagram of an example communication system including a wireless communication system within which the teachings of the present invention may well be practiced.

FIG. 1 illustrates an example communication system including a wireless communication system within which the teachings of the present invention may be practiced. As shown in FIG. 1, wireless communication system 102 is coupled to a wireline communication network 104. Wireless communication system 102 is depicted comprising one or more wireless handset(s) (or, subscriber units) 106, 108 communicatively coupled to one or more communication stations (or, base stations) 114 via wireless communication links 110, 112.

As shown, handsets 106, 108 may engage in a communication session with one another, or with other handset(s) (not shown) via one or more communicatively coupled communication station(s) (e.g., 114). Similarly, handsets 106, 108 may engage in a communication session with one or more wireline telephones 116, 118 via a wireless communication link (110, 112) established through an appropriate communication station (e.g., 114) coupled to the wireline network 104. Although not specifically depicted, those skilled in the art will appreciate that wireless network 102 may well be communicatively coupled to other wireless communication systems, e.g., through wireline network 104. In accordance with one example implementation, wireless communication system 102 is intended to represent a time-division multiple access (TDMA), time division duplex (TDD) communication system. It is to be appreciated, however, that the teachings of the present invention may well be readily adapted to other types of wireless communication systems such as, for example, FDMA or CDMA wireless communication systems without deviating from the spirit and scope of the present invention.

Figure 2:
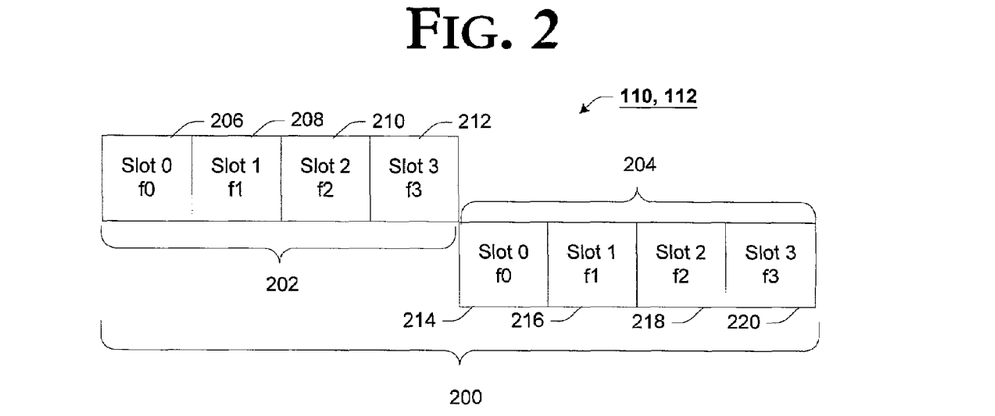
FIG. 2 is a graphical illustration of the elements of an example wireless communication link suitable for use in the wireless communication system illustrated in FIG. 1.

Turning briefly to FIG. 2, a graphical illustration of the elemental components of an example wireless communication link suitable for use in the wireless communication system of FIG. 1 is presented. In accordance with the illustrated example embodiment of FIG. 2, a graphical representation of a frame 200 of a time division multiple access (TDMA), time division duplex (TDD) wireless communication link is presented. As introduced above, in a TDMA-TDD wireless communication system 102 time on a particular carrier frequency is parsed into independent timeslots which delineate individual communication session, while time division duplexing (TDD) is employed to separate the uplink component from the downlink component.

According to one example implementation of a TDMA-TDD wireless communication system architecture, e.g., the Personal Handyphone System (PHS), a frame 200 consists of an uplink 202 component and a downlink 204 component, the composite of which being 5 ms long. With eight (8) timeslots per frame, each timeslot is 0.625 µs long. As shown, the uplink component 202 is comprised of four timeslots 206-212, while the downlink component is also comprised of four timeslots 214-220. In accordance with the illustrated example implementation, each of the uplink timeslots (e.g., 208) is associated with a corresponding downlink timeslot (e.g., 216) to support a single communication channel between a subscriber unit and a communication station within each frame.

In accordance with the example PHS implementation, the system operates in a frequency band around 1.9 GHz (1893.65 MHz-1919.45 MHz) with a carrier spacing of 300 kHz. In accordance with the PHS standard, carrier frequencies (e.g., F0, F1, F2, etc. in FIG. 2) are dynamically assigned by the communication station as the communication links (110, 112) are established. This dynamic assignment of channels is sometimes referred to as dynamic channel allocation, or DCA, and the channels are selected by the communication station 114. According to one implementation, communication station 114 takes into account a number of factors when allocating channels including, for example, available channels within the communication station, channel reuse metrics, and the effect of introduction of a particular channel on system interference.

Returning to FIG. 1, communication station 114 includes one or more transceiver(s) 116A . . . N which transmit and receive radio signals from subscriber units (e.g., 106, 108) within its coverage area (sometimes referred to as a cell) through one or more antenna(e) 111. Those skilled in the art will appreciate that a transceiver 114 includes a transmitter (Tx) element(s) and a receiver (Rx) element(s). Depending on the architecture of the wireless communication station 114, conventional communication stations will often transmit and/or receive using one or more of the antenna(e) 111. As discussed above, more advanced wireless communication stations may well employ smart antenna technology to improve link performance without a commensurate increase in overall link power. According to one example implementation, to be developed more fully below, one or more communication station(s) (e.g., 114) of wireless communication system 102 may well incorporate and/or interact with a multidimensional diversity agent to selectively introduce diversity in one or more of the space, time and/or frequency domains. The introduction of such multidimensional diversity provides a receiver with a number of decorrelated signals that are selectively combined to increase the effective receive signal strength of communication link component, thereby extending the effective range of the wireless communication link.

As with the communication station(s) 114, subscriber units 106, 108 also include a transmitter and a receiver to establish a wireless communication link 110, 112 with communication stations 114. Often, subscriber units rely on a single antenna element and, thus, do not benefit from spatial diversity in its receive path. It will be appreciated from the description to follow, however, that subscriber unit(s) incorporating the teachings of the present invention may well utilize diversity in the time and/or frequency domains to improve effective receive signal strength, thereby extending the effective range of the downlink component of a wireless communication link. According to one implementation, subscriber units 106, 108 are TDMA-TDD enabled, and are capable of selectively invoking repetition coding. In accordance with the example TDMA-TDD system, repetition coding involves redundantly transmitting the same information (i.e., the same conversation) on two or more timeslots in at least the uplink component 202 of the wireless link 110, 112. Alternatively, when implemented in a CDMA enabled system, repetition coding involves redundantly transmitting the same conversation over two or more channels (e.g., defined by separate PN codes). In the case of a CDMA system, such repetition coding is actually a form of system diversity insofar as that it could be implemented only by the infrastructure side of the communication link (e.g., not the subscriber unit), and then would require the use of at least two communication stations. But for their interaction with, or integration of, innovative the multidimensional diversity agent (described below), subscriber units 106, 108 are intended to represent any of a wide variety of subscriber units.

Those skilled in the art will appreciate that wireline network 104 facilitates telephony communication for one or more wireline telephone(s) 116, 118. It will be appreciated from the description to follow that the wireline network 104 and associated wireline telephones 116, 118 are not required to practice the teachings of the present invention. Rather, wireline network 104 is depicted within the context of FIG. 1 merely to provide a more thorough illustration of a typical wireless/wired telephony solution.

As used herein, the wireline network 104 is intended to represent any of a number of public and/or private telephony networks. In this regard, wireline network 104 represents one or more of the Public Switched Telephone Network (PSTN) (sometimes referred to as the plain-old telephone system (POTS)), a private branch exchange (PBX) system, and the like, communicatively coupling one or more telephones 116, 118 to each other as well as telephones in other communication systems (e.g., the wireless telephony network 102).

Thus, but for the introduction of an innovative multidimensional diversity agent in one or more of the system elements (e.g., 106, 108, 114), wireless communication system 102 is intended to represent any of a wide variety of communication systems known in the art.

EXAMPLE WIRELESS COMMUNICATION SYSTEM ELEMENT

In accordance with the teachings of the present invention, to be developed more fully below, wireless communication system 102 extends the concept of spatial diversity to multiple dimensions including one or more of time and frequency. In this regard, according to one aspect of the present invention, a multidimensional diversity agent is implemented in one or more of the system elements (106, 108, 114, etc.) to introduce signal diversity in one or more of the space, time and/or frequency domains in order to provide a number of decorrelated signals for selective, combinatorial processing in the receiver. Unlike conventional communication system elements which relied primarily on spatial diversity, the multidimensional diversity agent controls one or more aspects of receiver operation to selectively combine the decorrelated signals resulting from said multidimensional diversity to improve the effective range of the wireless communication link. In accordance with the example implementation, the multidimensional diversity agent selectively invokes repetition coding in one or more elements of the wireless communication system 102 to introduce timeslot diversity, which redundantly transmits information (e.g., conversational content) on multiple channels within the wireless communication link (110, 112). The decorrelated signals resulting from such timeslot diversity are then selectively combined in the receive path to effectively increase the receive signal strength, thereby increasing the effective range of at least the subject link component.

Figure 3:
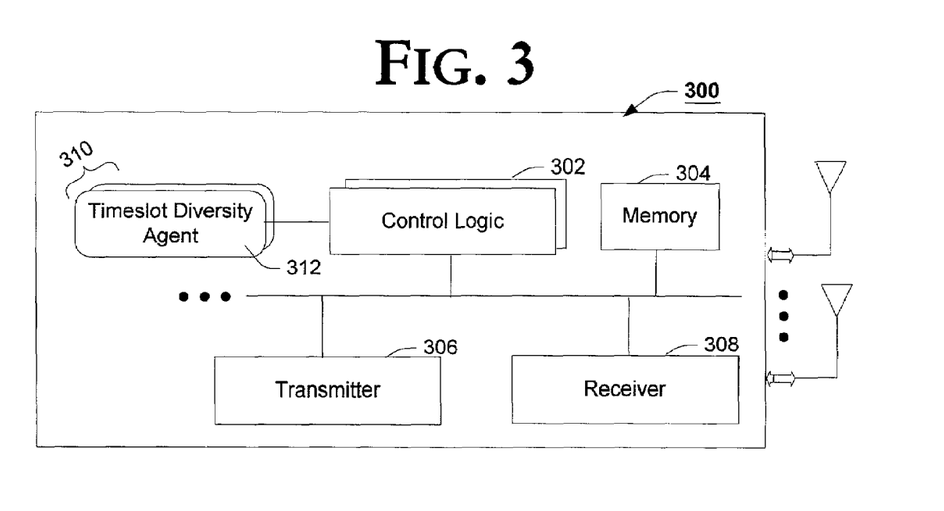
FIG. 3 is a block diagram of an example wireless communication system transceiver including a timeslot diversity agent, according to one example embodiment of the present invention.

FIG. 3 illustrates a block diagram of an example communication system element incorporating the teachings of the present invention. As used herein, communication system element 300 may well be implemented in a communication system (e.g., 102) as a subscriber unit (e.g., 106, 108), a communication station (e.g., 114), a system controller, or as an element of one of the foregoing.

In accordance with the illustrated example embodiment of FIG. 3, communication system element 300 is presented comprising control logic 302, memory means 304, a transmitter 306, a receiver 308 and one or more applications 310 including a timeslot diversity agent 312, each coupled as shown. Although depicted in FIG. 3 as a number of disparate blocks, one or more of the functional elements 302-312 of system element 300 may well be combined.

As used herein, control logic 302 selectively invokes an instance of one or more applications 310 which define one or more operational characteristics to control the communication resources (e.g., transmitter 306, receiver 308) of element 300. That is, control logic 302 controls certain transmit and receive characteristics to enable system element 300 to effectively communicate within the architecture of a given wireless communication system. In this regard, control logic 302 of system element 300 selectively invoke one or more of functions to advantageously control transmitter 306 and receiver 308 to effectively establish and maintain a wireless communication link. Thus, except as configured to effect the teachings of the present invention, control logic 302 is intended to represent any of a number of alternate control systems known in the art including, but not limited to, a microprocessor, a programmable logic array (PLA), a micro-machine, an application specific integrated circuit (ASIC) and the like. In an alternate implementation, controller 302 is intended to represent a series of executable instructions to implement the control logic described above.

As used herein, application(s) 310 are intended to represent a plurality of machine executable instructions and/or operational settings that may be executed by system element 300. More particularly, the instructions and operating parameters embodied within applications 310 provide the communication system element 300 with an operational "personality" when executed by, for example, control logic 302. In this regard, applications 310 may include instructions which, when executed by control logic 302, configure system element 300 to function in accordance with the Personal Handyphone System (PHS) TDMA-TDD standard. According to one aspect of the present invention, to be developed more filly below with reference to FIGS. 4-10, system element 300 is depicted comprising multidimensional diversity agent 312 which, when executed by control logic 302, introduces one multidimensional diversity in at least one link component of a wireless communication link, and causes a receiver to selectively combine at least a subset of the resulting decorrelated signals to improve effective signal strength of the wireless link component. Although depicted as one of a number of applications 310, those skilled in the art will appreciate from the description to follow, that a firmware or hardware implementation of timeslot diversity agent 312 may well be envisioned without deviating from the spirit and scope of the present invention.

In this regard, although diversity agent 312 may well improve the effective signal strength by introducing such multidimensional diversity, it is done at the cost of system capacity as the repetition coding consumes one or more additional channels which may have been assigned to service a commensurate one or more additional users. According to one implementation, system 102 only utilizes channel diversity (i.e., in the time and/or frequency domains) on calls deemed to be a high priority (e.g., emergency telephone calls, the user is paying a premium for a high quality of service (QoS), etc.). In an alternate implementation, channel diversity is selectively implemented to improve a weak link component whenever the capacity is available to support the assignment of multiple channels to a given communication session.

For ease of illustration and explanation, multidimensional diversity agent 312 is presented as a functional module of system element 300. Those skilled in the art will appreciate, however, that multidimensional diversity agent 312 need not be co-located with, for example, the radio elements (e.g., transmitter/receiver elements) of the wireless communication system and yet interact with such radio elements (e.g., 106, 108 and/or 114) to implement the teachings of the present invention. Indeed, it should be appreciated that although multidimensional diversity agent 312 is presented as a single, functional entity for ease of explanation, alternate embodiments are envisioned wherein certain functional and/or control elements of agent 312 are distributed among and between otherwise disparate elements of wireless communication system 102. In this regard, the functional elements of multidimensional diversity agent 312, to be developed more fully below, need not be co-located as depicted in FIG. 3.

Transmitter 306 is selectively used by control logic to transmit information, e.g., conversational content, from element 300 to another wireless communication system element (not shown) via a wireless communication channel. In an implementation wherein element 300 is a subscriber unit (e.g., 106, 108) transmitter 306 establishes and maintains the uplink component of the wireless communication link in accordance with a communication standard, or personality dictated by control logic 302 (e.g., the PHS communication standard). In the alternate implementation wherein element 300 is utilized as a communication station (e.g., 114), transmitter 306 establishes and maintains the downlink component of the wireless communication link.

Receiver 308 is selectively utilized by control logic 302 to receive information, e.g., conversational content, by element 300 from another wireless communication system element via one or more antenna(e) over one or more wireless communication channels. Unlike conventional receivers, however, receiver 306 under control of control logic 302 implementing an instance of diversity agent 312, selectively utilizes the signal energy from multiple decorrelated signals to reconstruct the transmitted information. To further illustrate the functional operation of a receiver, attention is now directed to FIG. 4.

Figure 4:
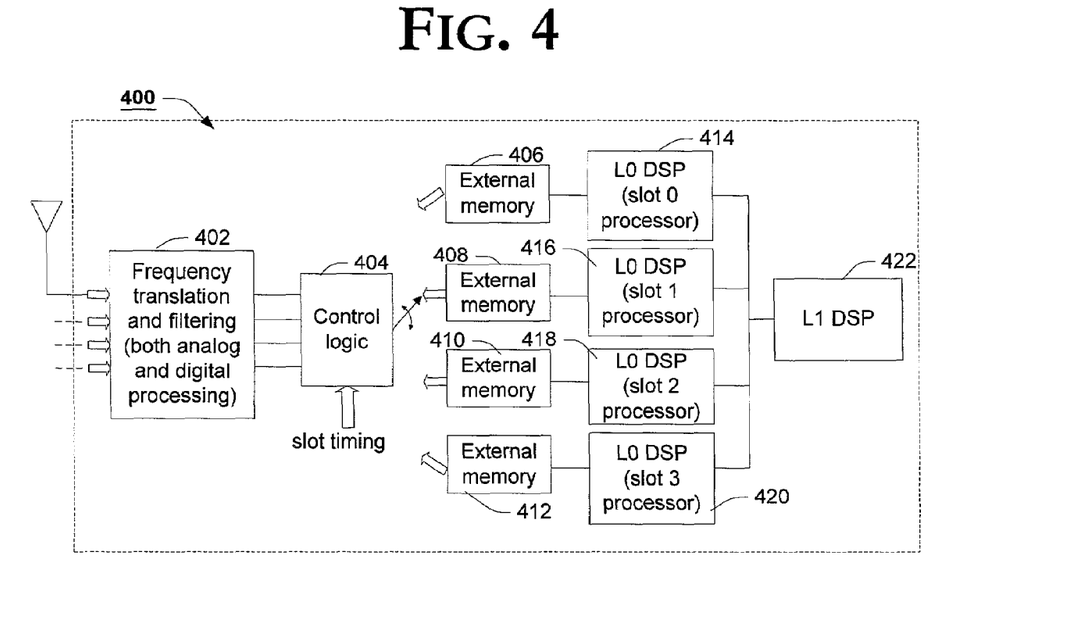
FIG. 4 is a functional block diagram of an example receiver within which maximal ratio combining (MRC) is selectively employed, according to one aspect of the present invention.

FIG. 4 is a functional block diagram of an example receiver that may be utilized by multidimensional diversity agent to improve the effective range of a wireless communication link, in accordance with one embodiment of the present invention. In accordance with the illustrated example embodiment of FIG. 4, receiver 400 is presented comprising frequency translation and filtering stage(s) 402, control logic 404, a number of external memory locations 406-412, a first (L0) channel processing stage 414-420 and a second (L1) channel processing stage, each coupled as depicted. Frequency translation and filtering module 402 receives the RF signal from the antenna(e), downconverts the signal to an intermediate frequency (IF), filters the downconverted signal to reduce noise elements, and digitizes the IF signal for conversion to baseband. The filtered signals are then distributed by control logic 404 to the external memory 406-412 associated with the first stage (L0) channel processor(s) 414-420, respectively.

In accordance with the illustrated example implementation, the first stage channel processor(s) 414-420 are each associated with an individual channel (e.g., timeslot), wherein control logic 404 distributes each of the signals received to an appropriate timeslot processor for spatial processing. Thus, in an implementation where four (4) antennae are used, each timeslot processor 414-420 will receive a signal associated with a corresponding timeslot from each of the four antennae (e.g., four different receive paths). In this regard, four independently received signals containing the same information are received at each of the L0 processors.

In response to receiving the signals, L0 processors 414-420 selectively combine the signals to generate a spatial composite of the received signals, utilizing the energy of each of the received signals in an effort to improve the signal to noise ratio of the received signal.

According to one example implementation of combinatorial diversity, one or more of the L0 processors 414-420 are instructed to implement maximal ratio combining (MRC) to effectively utilize the energy from each of the spatially diverse receive paths in generating the spatial composite of the received signals. Under MRC, the affected L0 processors 414-420 derive a weighting value that is assigned to each of the antennae, and co-phase the signals for combining. According to one implementation, the MRC weight assigned to an individual antenna is based, at least in part, on the received signal strength at the antenna. It is to be appreciated that in alternate implementations, alternate measures from which antennae weights can be derived may well be used without deviating from the spirit and scope of the present invention. Mathematically, the MRC selectively employed in one or more of the L0 processors is represented as:

$$\hat{s}_N(k) = \sum_{j=1}^{M} a_{Nj}^*(a_{Nj}s(k) + n_{Nj}(k)) \quad (1)$$

where: $\hat{s}_N(k)$ is the best estimate of the message signal s(k) for timeslot N;

M is the number of spatially diverse signals;

$\alpha_{Nj}$ represents the attenuation and phase distortion introduced by the channel;

$\alpha_{Nj}^*$ makes the useful signal components co-phased;

The expression within the parentheses ( ) is the effect of the channel on the transmitted signal, wherein n is the noise component, and $a_{Nj}$ is the effect of the channel.

Thus, each L0 processor 414-420 implementing MRC phase aligns the signals received on each of M antennae, applies a derived MRC weight to each of the branches, and sums them to generate a one-dimensional representation of the M-dimensional input. Thus, L0 processors 414-420 implementing MRC utilize the signal energy from each of the branches to generate the best estimate of the transmitted message.

According to one implementation, i.e., where merely spatial diversity is employed, this best estimate from each timeslot is then forwarded to the second channel processing stage (L1) 422 for further processing and delivery to the appropriate communication network element (e.g., wireline telephone 118 via wireline network 104). In accordance with the illustrated example implementation, each of the L0 channel processors 414-420 and the L1 channel processor 422 are implemented in a corresponding one or more digital signal processor(s) (DSP). Those skilled in the art will appreciate, however, that the teachings of the present invention may well be translated to other processing logic without departing from the spirit and scope of the present invention.

As introduced above, multidimensional diversity agent 312 may selectively introduce diversity in additional diversity domains such as, for example, the time domain and/or the frequency domains in an effort to further improve communication link performance characteristics. In accordance with the illustrated example implementation described herein, diversity agent 312 instructs a transmitter of a weak link component to invoke repetition coding, thereby further introducing timeslot diversity into a wireless communication link that already benefits from spatial diversity. In accordance with this embodiment of the present invention, two or more of the L0 channel processors 414-420 independently implement MRC (discussed above) to generate an independent one-dimensional representation of the received four-dimensional signal. Assume, for example, that diversity agent 312 instructs a subscriber unit to invoke repetition coding on multiple timeslots (e.g., timeslot 1 and timeslot 3) to implement timeslot diversity. A graphical representation of a TDMA-TDD frame implementing repetition coding is presented with reference to FIG. 8.

Figure 8:
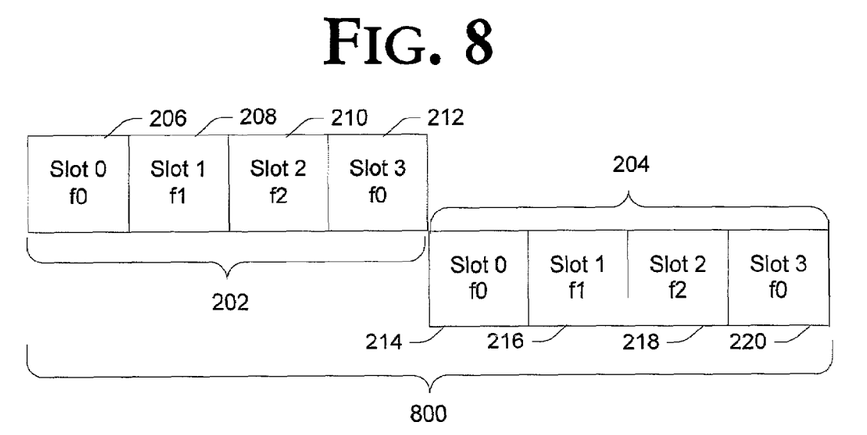
FIG. 8 graphically illustrates the uplink and downlink components of a TDMA-TDD communication channel implementing slot diversity, in accordance with one aspect of the present invention.

Jumping briefly to FIG. 8, a graphical illustration of the uplink and downlink components of a TDMA-TDD frame implementing timeslot diversity is presented, in accordance with one aspect of the present invention. In accordance with the illustrated example implementation of FIG. 8, each of the shaded timeslots, i.e., timeslot 206 and 212 of uplink 202, and corresponding timeslots 214 and 220 of downlink 204 of frame 800 are assigned to support a single communication session between a subscriber (e.g., 106) and a communication station (e.g., 114). As depicted in FIG. 8, each of the timeslots participating in repetition coding share a common frequency (denoted as f0). In an alternate implementation, diversity agent 312 may well invoke dynamic channel allocation among the timeslots participating in repetition coding. An example of a TDMA-TDD frame introducing diversity in the time and frequency domain is illustrated with reference to FIG. 9.

Figure 9:
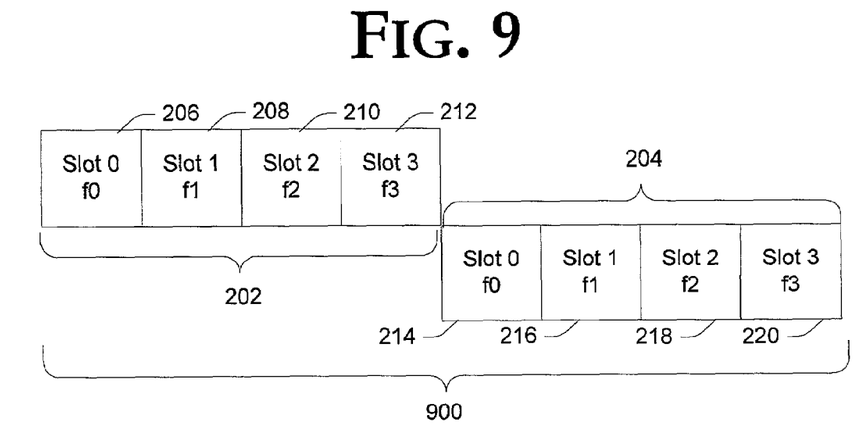
FIG. 9 graphically illustrates the uplink and downlink components of a TDMA-TDD communication channel implementing slot and frequency diversity, in accordance with one aspect of the present invention.

FIG. 9 graphically illustrates the uplink and downlink components of a TDMA-TDD frame 900 implementing time and frequency diversity, in accordance with another aspect of the present invention. As depicted in FIG. 9, each uplink/downlink pair of timeslots participating in repetition coding 202/214 and 212/220, respectively, are assigned a unique carrier frequency. According to one implementation, when invoking frequency diversity, multidimensional diversity agent 312 dynamically selects the frequency for the individual pairs. As introduced above, the selection of such channels is performed to have minimal impact on communication station and/or system performance.

Returning to FIG. 4 and, more particularly, the spatial processing of a received communication link signal (e.g., 800) characterized by multidimensional diversity, L0 processor 414 and L0 processor 420 each receive four independent representations of the signal associated with a particular timeslot from each of the four antennae. L0 processors 414, 420 each utilize MRC processing, as above, to generate a one-dimensional spatial composite signal representation of their respective timeslots (i.e., timeslot 0 and timeslot 3). However, unlike the typical TDMA-TDD communication system model, wherein the conversation content of the different timeslots are independent of one another, in a repetition-coded environment the information in the multiple timeslots are the same.

Thus, in accordance with one example implementation, each of the spatial composite signals from the L0 processor (s) 414-420 associated with a timeslot of the weak link component undergo an additional processing stage to combine these temporally decorrelated representations of the transmitted signal. In certain implementations, the easiest approach to combining the spatial composites from each of the timeslot(s) associated with the weak link component is to pass the composites to the L1 processor 422, which also implements MRC to effectively combine the signal energy from the multiple timeslots to further enhance the signal to noise ratio, in accordance with the teachings of the present invention. Mathematically, the MRC employed in combining the temporally diverse spatial composite signals can be represented as:

$$\hat{s}(k) = \sum_{j=1}^{M} a_{Mj}^*(a_{Mj}s(k) + n_{Mj}(k)) \quad (2)$$

where: M is the number of timeslots consumed in the repetition coding.

Figure 5:
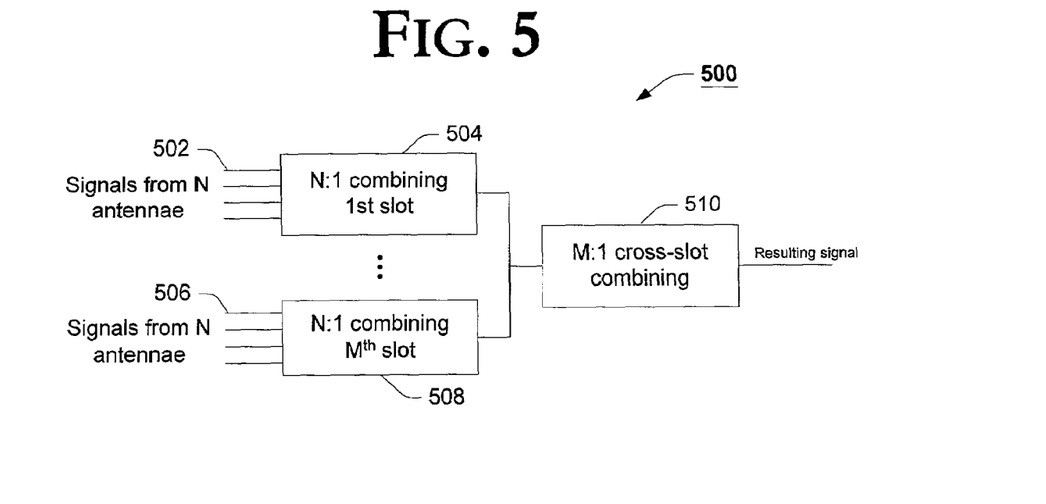
FIG. 5 is a functional block diagram of an example two-stage combining architecture for spatial processing within a receiver, according to one aspect of the present invention.

Graphically, this multistage combining of the space, time and/or frequency diverse signals is presented with reference to FIG. 5.

In certain implementations, however, operational demands placed on the L1 processor 422 may preclude it from performing this second stage of MRC processing. Recall that in our illustrated example embodiment, the L1 processor 422 is tasked with processing a new channel every 625 µs (i.e., potentially during every timeslot), whereas each of the L0 processors 414-420 have up to just under 5 ms to complete their processing. Thus, in accordance with one aspect of the present invention, once spatial processing of the temporally first timeslot is completed (e.g., L0 processor 414), it is passed to the L1 processor 422 where it is forwarded to a subsequent L0 processor (e.g., 418) for further MRC processing in accordance with equation 2, above. This second L0 processor 418 will perform MRC combining (eq. 1) on the spatially diverse signals received from antennae (110), and then perform an additional MRC processing (eq. 2) to combine the temporally diverse signals (e.g., associated with timeslot 1 and 3). This concept may be carried to implementations comprising two or more timeslots, i.e., wherein each timeslot performs its spatial processing and passes spatial composite, through L1 processor 422, to a selected L0 processor for temporal processing (utilizing MRC). According to one implementation, described more fully below, the L0 temporally first L0 processor(s) coarsely quantize their spatial composite signal to reduce the amount of data passed through L1 processor 422 to the L0 processor performing the temporal diversity processing.

FIG. 5 presents a functional block diagram of the multistage combining process of a wireless communication link characterized by diversity in two or more of the space, time and/or frequency domains, in accordance with one aspect of the present invention. As depicted in FIG. 5, a plurality (M) N:1 L0 processing modules 504, 508 each receive spatially diverse signals from N antennae 502, 506, respectively. The energy from the spatially diverse signals 502, 506 is combined using maximal ratio combining (MRC) techniques, described above, to generate a one-dimensional representation of the times lot energy received from each of the N antennae.

In accordance with the multi-dimensionally diverse characteristics associated with implementation of the present invention, the otherwise independent M timeslots each correspond with the same communication session. Accordingly, the one-dimensional signal representations are passed to an M:1 processing module 510, which selectively combines the M one-dimensional signals to generate a representation of the originally transmitted information. According to one example implementation, described above, one of the L0 processors 414-420 is selected for the MRC processing of the temporally diverse signals generated by the L0 processors. Such an implementation has the benefit of reducing the computational impact the innovative multidimensional diversity has on the L1 processor 422. In accordance with another implementation, the L0 processors 414-420 perform MRC processing of the spatially diverse signals, while the L1 processor 422 performs MRC processing of the temporally diverse signals from each of the L0 processors.

Introducing multidimensional diversity into the communication link is only effective if it can be positively acted by the communication system elements to improve the range and or operating characteristics of the wireless communication link. In this regard, multidimensional diversity agent 312 delivers by selectively processing multi-dimensionally diverse signals to improve the effective signal strength wireless communication link.

In accordance with yet another embodiment of the present invention, multidimensional diversity agent 312 instructs the L0 processors 414-420 to implement selective MRC combining. In many implementations of digital communication, including digital wireless communication, the frames or packets of digital information include error control information that enables each element of the communication system to confirm that it has received an accurate version of the transmitted signal. Such is the case, for example, in our illustrated example implementation of the Personal Handyphone System. In such an implementation, multidimensional diversity agent 312 instructs the temporally first of the multiple L0 timeslot processors (e.g., 414 in our example) to perform an error control check to determine whether the spatially diverse signal was accurately recovered. According to one embodiment, the temporally first 414 of the multiple L0 timeslot processors 414-420 demodulates the received signal and performs a cyclical redundancy check (CRC) on error control information contained, for example, in the received communication link. If the CRC is positive, the L0 processor 414 determines that the transmitted signal has been accurately recovered, and further MRC processing of the temporally diverse timeslots is omitted.

Nonetheless, even though the redundant timeslots are not required MRC processing in the time domain the MRC weights generated in the temporally subsequent L0 processors are useful in controlling one or more aspects of the associated downlink component of the wireless communication link. That is, the MRC weights provide useful information regarding the location of the user, the operational "state" of the wireless channel, interference information, and the like. Accordingly, in certain embodiments of the present invention, the MRC weight information calculated during at least MRC processing of the spatially diverse signals in the redundant timeslots performed and utilized in management of the downlink component of the wireless communication link, e.g., in beam forming, interference rejection, etc.

EXAMPLE OPERATION AND IMPLEMENTATION

Figure 6:
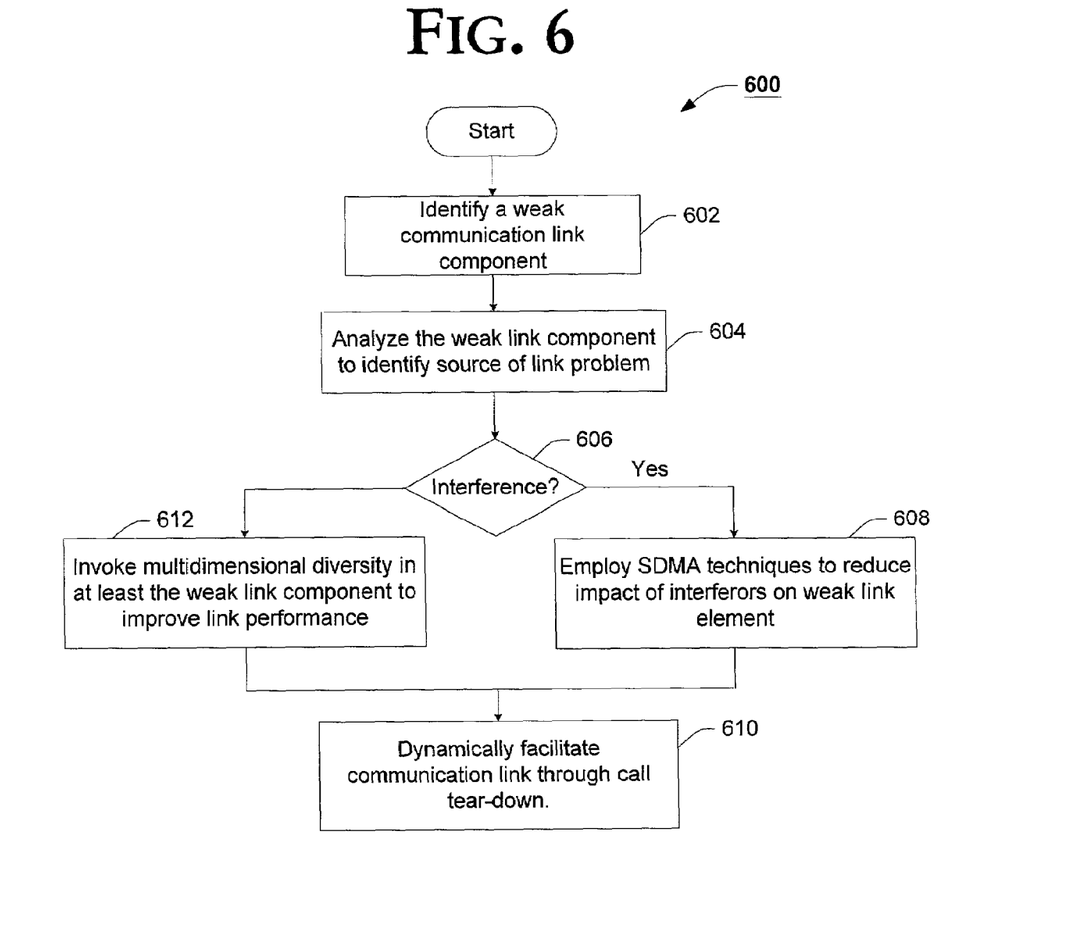
FIG. 6 is a flow chart of an example method for extending the effective range of a communication link, in accordance with the teachings of the present invention.
Figure 7:
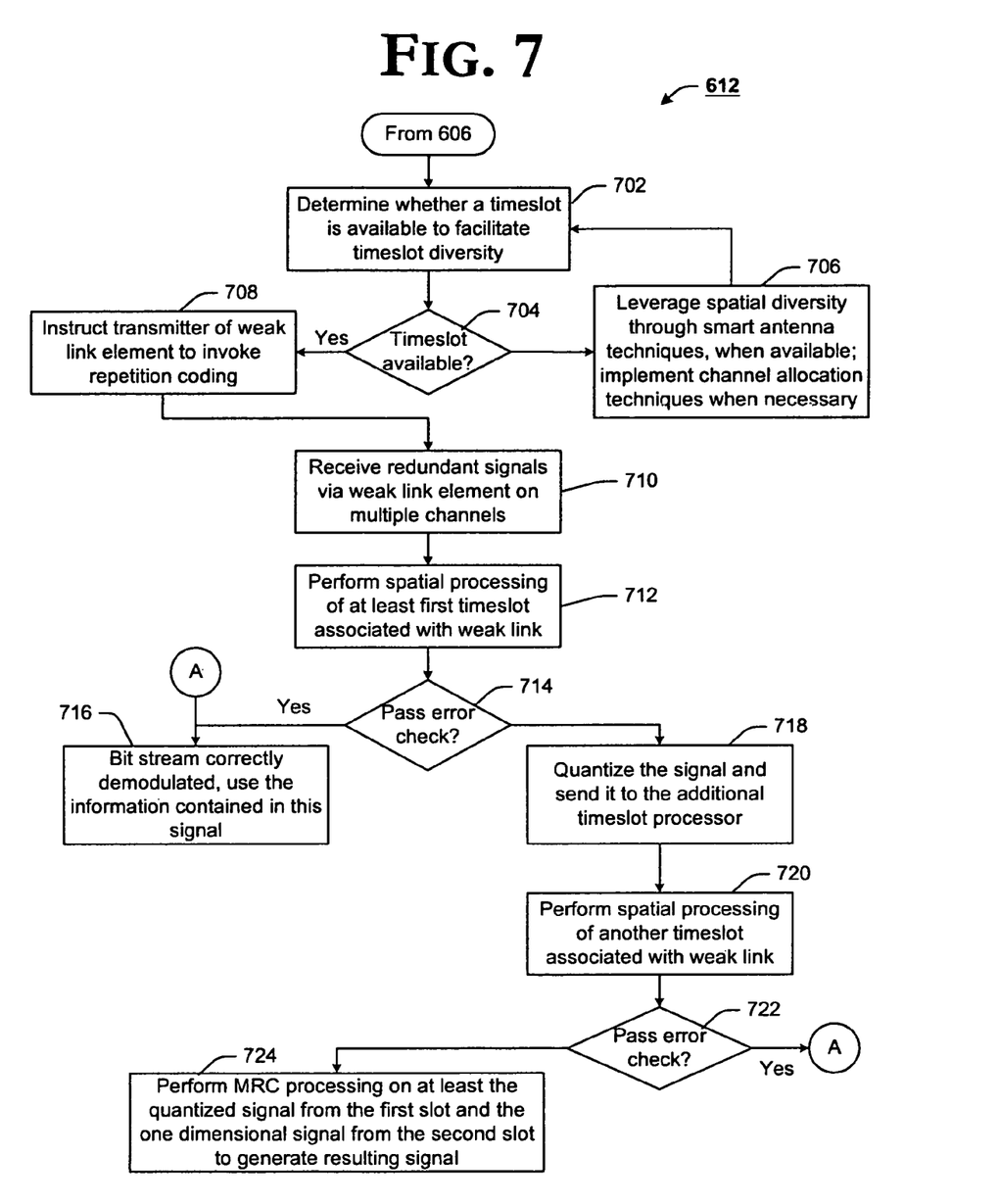
FIG. 7 is a flow chart of an example method for implementing timeslot diversity to improve a weak link element of a communication link, according to one embodiment of the present invention.

Having introduced the functional and architectural elements of the present invention with reference to FIGS. 1 and 2, an example operation and implementation will be further developed with reference to FIGS. 6 and 7. For ease of illustration, and not limitation, operational detail of an example embodiment of the present invention will be illustrated with continued reference to our example implementation within a TDMA-TDD communication system. More particularly, in accordance with the illustrated example implementation, diversity agent 312 is implemented within communication station 114 to extend the effective range of an uplink component between subscriber 106 and the communication station 114 by introducing and effectively utilizing multidimensional diversity in the associated wireless communication link 110.

FIG. 6 is a flow chart of an example method for extending the effective range of a communication link, in accordance with the teachings of the present invention. In accordance with the illustrated example embodiment of FIG. 6, the method begins with block 602 wherein a weak link component, e.g., the uplink component 202, is identified in a wireless communication link 110. As introduced above, any of a number of signal characteristics such as signal level, signal to noise ratio, signal to noise and interference ratio (SINR), and/or a carrier to interference ratio (CIR) and/or other interference characteristics, etc. are monitored by control logic 302 to detect and identify problems in the wireless communication link.

In block 604, control logic 302 analyzes one or more of the signal characteristics to determine the nature of the link problem. In this regard, control logic 302 may well monitor any of a number of performance characteristics such as, for example, receive signal strength, signal to noise ratio, interference metrics, and the like. According to one example implementation, control logic 302 monitors receive signal strength to determine whether to implement an instance of diversity agent 312. According to one implementation, control logic 302 compares the received signal strength against a threshold value to determine whether the receive signal strength is acceptable. Based on the analysis in block 604, control logic 302 determines whether the identified problems are associated with co-channel interference, block 606. As will be discussed in greater detail below, introduction of multidimensional diversity in a communication exhibiting co-channel interference, may actually exacerbate the uplink performance problems.

If, in block 606 control logic 302 determines that the weak link component is suffering from interference, control logic 302 selectively implements spatial domain processing techniques to reduce the impact of the interferors on the weak link element. According to one example implementation, for example, control logic 302 may change one or more channel allocations of the active wireless links in an effort to reduce co-channel interference. In block 610, control logic 302 continues to dynamically facilitate the communication link through call tear down.

Returning to block 606, if control logic determines that the poor performance characteristics of the identified weak link are not the result of interference, control logic 302 selectively invokes an instance of multidimensional diversity agent 312 to introduce one or more of space, time, and/or frequency diversity in at least the weak link in an effort to increase the number of decorrelated signals which the receiver selectively combines to increase the effective receive signal strength of the underperforming link component. An example method for introducing space, time and/or frequency diversity in the weak link component is further developed with reference to FIG. 7.

FIG. 7 is a flow chart of an example method for implementing multidimensional diversity to improve the performance of a weak link component of a wireless communication link, in accordance with the teachings of the present invention. As shown, the method of FIG. 7 begins with block 702 wherein control logic 302 determines whether an additional channel is available to implement channel diversity in at least the weak link component of the wireless link. In accordance with the illustrated example implementation of the TDMA-TDD system, control logic 302 determines whether an additional timeslot is available to implement repetition coding, block 704. If a timeslot is not available, diversity agent 312 may attempt to further leverage the any existing spatial diversity by implementing one or more smart antenna techniques, if not already enabled, block 706.

It is envisioned, in accordance with certain implementations, that diversity agent 312 may take into account a priority level of the communication associated with the weak link component when deciding how to proceed when an additional communication channel is not readily available. In certain wireless communication system architectures, for example, an indication regarding the level of service is transmitted within the wireless communication link, e.g., an indication of an emergency telephone call, a high QoS indication, and the like. In certain implementations, wherein diversity agent 312 detects a weak link component in a communication link that includes a high priority indication, diversity agent 312 may well tear-down an existing call to free a timeslot to improve the signal quality of the high priority call. According to one implementation, diversity agent 312 utilizes a first-in, first-out (FIFO) selection process to identify which of the existing calls to tear down. According to one implementation, diversity agent provides the user falling victim to this channel allocation technique with an indication that their call is being torn-down to facilitate a high-priority call.

If, in block 704 a timeslot is available, or a timeslot is made available in block 706, the process continues with block 708 wherein diversity agent 312 instructs the transmitter of the weak link component to invoke repetition coding. According to one implementation, diversity agent 312 issues the command via one or more of a control bus, a control channel of a wireless communication link, a sideband of a wireless communication link, and the like. According to one implementation, diversity agent 312 includes in the instruction to invoke repetition coding an indication of the timeslot(s) to use. In accordance with another aspect of the present invention, DCA is employed by element 300 to add diversity in yet another domain, i.e., the frequency domain. In this regard, multidimensional diversity agent 312 may well participate in the channel assignment in an effort to establish the greatest frequency diversity possible, constrained by competing factors of the communication station and/or the system.

In block 710, the receiver of the repetition-coded signals receives the redundant signals through a weak link component on multiple channels, in this example, multiple timeslots. As introduced above, the received signals are downconverted, filtered and digitally sampled to baseband wherein an M-dimensional signal (from M antennae) are passed to each of the first stage spatial processors, i.e., L0 processors 414-420.

As discussed above, a temporally first L0 processor (414-420) associated with a first timeslot of the repetition-coded signal performs initial spatial processing on the temporally first timeslot associated with the weak link component, block 712. In accordance with one aspect of the invention, the L0 processor combines the M-dimensional signal into a one-dimensional representation of the received signal using maximal ratio combining, as discussed above. The one dimensional signal representing the temporally first timeslot is then demodulated and the integrity of the demodulated signal is determined, e.g., using one of a number of well-known error checking procedures. In accordance with the illustrated example implementation, the L0 processor performs a cyclical redundancy check (CRC) of error control information contained within the demodulated signal.

In block 714, diversity agent 312 determines whether the demodulated representation of the temporally first timeslot contains the originally transmitted signal. As discussed above, the L0 processor performs an error check to determine if the signal was received without error. If so, the process continues with block 716, wherein the information from the first timeslot is used to represent the weak link component of the communication link. Nevertheless, as discussed above, MRC processing in the subsequent timeslots may continue in order to derive the MRC weights which are used in the control of the downlink component of the wireless communication link.

If, in block 714 diversity agent 312 determines that the demodulated frame did not pass the error control process, the spatially combined modulated representation of the signal is passed to an L0 timeslot processor associated with a subsequent timeslot of the weak link component, block 718. More particularly, as discussed above, the temporally first timeslot processor (e.g., 412) sends the spatial composite signal to the subsequent L0 processor via the L1 processor 422. In accordance with one embodiment, to reduce the amount of data transferred to the L1 processor 422, the L0 processor associated with the temporally first timeslot quantizes the MRC combined signal more coarsely, effectively reducing the size of the signal before transferring the signal to the L1 processor.

In block 720, if not performed in parallel with the temporally first timeslot, L0 processor(s) associated with the remaining timeslot(s) of the repetition-coded signal perform spatial processing of their respective timeslots associated with the weak link component. As above, the timeslot(s) are demodulated in order to facilitate an error check of the demodulated signal. If, in block 722, diversity agent 312 determines that the demodulated representation of the MRC combined signal within a subsequent L0 processor is accurate, i.e., passes the error control check, the process continues with block 716 discussed above.

If the error control process fails, block 722, the process continues with block 724 wherein the spatial composite signal(s) from each of the remaining timeslot(s) of the repetition-coded signal MRC processed in a select L0 processor. In an alternate embodiment, as introduced above, each of the L0 processors 414-420 associated with the weak link component pass their spatial composite signal to L1 processor 422 to perform the MRC processing of the temporally diverse signals to produce the best estimate of the originally transmitted signal content. Under either implementation, the process continues with similar processing of subsequent frames facilitating the communication link until an indication of tear down is received.

Although FIG. 7 describes an example implementation wherein processing on a temporally first timeslot is performed before spatial processing on subsequent timeslots begins, those skilled in the art will appreciate that this is for ease of explanation. Alternate implementations are envisioned wherein L0 spatial processing is performed in parallel, or spatial processing on a timeslot other than the temporally first timeslot is dynamically selected for prioritized spatial processing, e.g., on the basis of receive signal strength, SNR, etc. In addition, although discussed in the context of a weak link only (e.g., the uplink) those skilled in the art will appreciate that invocation of repetition-coding in the uplink component may introduce repetition coding in the downlink (otherwise the downlink contains a wasted timeslot). If the subscriber unit is endowed with diversity agent 312, or is otherwise able to take advantage of the repetition coding in the downlink component, the extra energy provided to the subscriber in the redundant transmission over multiple channels can enable the communication station to lower the power applied to each individual timeslot.

ALTERNATE EMBODIMENTS

Figure 10:
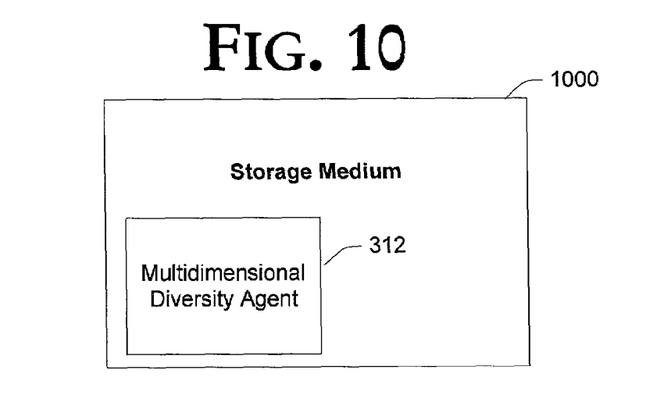
FIG. 10 illustrates an example storage medium comprising a plurality of executable instructions which, when executed by a processing device, implements the teachings of the present invention, in accordance with another embodiment of the present invention.

FIG. 10 is a block diagram of a storage medium having stored thereon a plurality of instructions including instructions to implement the multidimensional diversity agent 312, according to yet another embodiment of the present invention. In general, FIG. 10 illustrates a storage medium/device 1000 having stored thereon a plurality of machine-executable instructions including at least a subset of which that, when executed, implement the innovative diversity agent 312 of the present invention.

As used herein, storage medium 1000 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 1000 need not be co-located with any host system. That is, storage medium/device 1000 may well reside within a remote server communicatively coupled to and accessible by an executing system. Accordingly, the software implementation of FIG. 10 is to be regarded as illustrative, as alternate storage media and software embodiments are anticipated within the spirit and scope of the present invention.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

We claim:

1. A method comprising:
   determining that an effective signal strength of a signal on a wireless communication link using signal diversity in one or more of the space, time, or frequency domains is insufficient to provide a desired communication range;
   introducing signal diversity in an additional of the space, time, or frequency domains into the wireless communication link in response to the determining to generate multiple decorrelated signals corresponding to the signal on the wireless communication link; and
   selectively combining the decorrelated signals and demodulating the combined, decorrelated signals to generate a representation of the content of the signal.

2. A method comprising:
   providing a wireless communication link with a level of diversity;
   detecting a degradation of signal quality on the wireless communication link; and
   dynamically introducing additional diversity on the wireless communication link to result in the wireless communication link having diversity in two or more of the space, time, or frequency domains in response to detecting the degradation of signal quality, to generate a plurality of decorrelated signals to be selectively combined with at least the use of a weight vector and demodulated to provide a representation of an originally transmitted signal.

3. A method according to claim 2, wherein the wireless communication link comprises an uplink to a communication station.

4. A method according to claim 2, wherein detecting the degradation of signal quality on the wireless communication link comprises determining that a signal quality characteristic of the wireless communication link has achieved a threshold value associated with the characteristic.

5. A method according to claim 4, wherein the signal quality characteristic includes one or more of a receive signal strength, a signal to noise ratio (SNR), a bit error rate (BER), a frame error rate (FER), signal to noise and interference ratio (SINR), or a carrier to interference ratio (CIR).

6. A method according to claim 2, wherein introducing additional diversity comprises:
   communicating on a first channel of the wireless communication link;
   determining whether a second channel is available on the wireless communication link to support repetition coding; and
   invoking repetition coding to transmit a repetition coded signal on the first channel and on the second channel of the wireless communication link to provide channel diversity.

7. A method according to claim 6, wherein a channel is a timeslot on a particular carrier frequency.

8. A method according to claim 7, further comprising:
   introducing frequency diversity in the repetition-coded signal, wherein each timeslot is dynamically assigned to an independent carrier frequency.

9. A method according to claim 6, wherein determining whether a second channel is available comprises determining whether a timeslot is available to support repetition coding.

10. A method according to claim 6, wherein introducing additional diversity further comprises:
    enabling receipt of a signal via multiple channels and multiple receive paths.

11. A method according to claim 10, wherein enabling receipt via multiple receive paths comprises:
    receiving the signal through multiple antenna elements.

12. A method according to claim 10, wherein the signals to be selectively combined comprises a receiving component of the wireless communication link:
    performing initial spatial processing on a first channel by adding energy of signals associated with the channel via the multiple receive paths to form a composite signal of the associated signals;
    performing an error control check on the composite signal; and
    combining spatially processed composite signals associated with each of the channels including the repetition coded signal if the error control check on the composite signal fails.

13. A method according to claim 12, wherein spatial processing comprises:
    combining each spatially diverse signal representation of the channel received from the multiple receive paths utilizing maximal ratio combining (MRC).

14. A method according to claim 12, wherein the error control check comprises:
    demodulating the composite signal;
    extracting error control information from at least a subset of the demodulated signal; and
    performing a cyclical redundancy check (CRC) using the error control information to determine whether the demodulated signal matches an originally encoded signal.

15. An article of manufacture comprising a machine accessible storage device having a plurality of executable instructions which, when executed, cause the executing machine to perform operations including:
    providing a wireless communication link with a level of diversity;
    detecting a degradation of signal quality on the wireless communication link; and
    dynamically introducing additional diversity on the wireless communication link to result in the wireless communication link having diversity in two or more of the space, time, or frequency domains in response to detecting the degradation of signal quality, to generate a plurality of decorrelated signals to be selectively combined with at least the use of a weight vector and demodulated to provide a representation of an originally transmitted signal.

16. An article of manufacture according to claim 15, wherein detecting the degradation of signal quality on the wireless communication link comprises determining that one or more of a receive signal strength, a signal to noise ratio (SNR), a bit error rate (BER), a frame error rate (FER), signal to noise and interference ratio. (SINR), or a carrier to interference ratio (CIR) of the wireless communication link has achieved a threshold value associated with the characteristic.

17. An article of manufacture according to claim 15, wherein introducing additional diversity comprises:

communicating on a first channel of the wireless communication link;

determining whether a second channel is available on the wireless communication link to support repetition coding; and invoking repetition coding to transmit a repetition coded signal on the first channel and on the second channel of the wireless communication link to provide channel diversity.

18. A wireless communication system element comprising:

a transceiver to establish a wireless communication link over which to transmit and receive wireless communication signals in a wireless communication session with a different system element; and a multidimensional diversity agent, coupled to the transceiver, to detect a degradation of signal quality on the wireless communication link, and in response to detecting the degradation of signal quality, selectively introduce additional diversity on the wireless communication link to result in the wireless communication link having diversity in two or more of the space, time, or frequency domains to generate a plurality of decorrelated signals, to selectively combine with at least the use of a weight vector the decorrelated signals, and to demodulate the combined signals to provide a representation of an originally transmitted signal.

19. A wireless communication system element according to claim 18, wherein the system element is a communication station, and wherein the additional system element is a subscriber unit.

20. A wireless communication system element according to claim 18, wherein the agent to detect the degradation of signal quality on the wireless communication link comprises the agent to determine that one or more of a receive signal strength, a signal to noise ratio (SNR), a bit error rate (BER), a frame error rate (FER), signal to noise and interference ratio (SINR), or a carrier to interference ratio (CIR) of the wireless communication link has achieved a threshold value associated with the characteristic.

21. A wireless communication system element according to claim 18, the agent to introduce additional diversity comprises the agent to:

determine whether an additional channel is available on the wireless communication link to support repetition coding; and invoke repetition coding to transmit a repetition coded signal on the additional channel to provide channel diversity with an original communication channel on the wireless communication link.

22. A wireless communication system element according to claim 21, wherein a channel is a timeslot on a particular carrier frequency, the agent to further:

introduce frequency diversity in the repetition-coded signal, wherein each timeslot is dynamically assigned to an independent carrier frequency.

23. A wireless communication system element according to claim 21, wherein the agent to determine whether an additional channel is available comprises the agent to determine whether a timeslot is available to support repetition coding.

24. A wireless communication system element according to claim 21, wherein the agent to introduce additional diversity further comprises the agent to:

enable receipt of a signal via multiple channels and multiple receive paths corresponding to multiple antenna elements.

25. A wireless communication system element according to claim 24, wherein the agent to selectively combine the signals comprises the agent to:

perform initial spatial processing on a first channel by adding energy of signals associated with the channel via the multiple receive paths to form a composite signal of the associated signals;

perform an error control check on the composite signal; and combine spatially processed composite signals associated with each of the channels including the repetition coded signal if the error control check on the composite signal fails.

26. A wireless communication system element according to claim 18, wherein the system element is a subscriber unit, and wherein the additional system element is a communication station.

27. A method comprising:

determining that an effective signal strength of a signal on a wireless communication link using a level of signal diversity is insufficient to provide a desired communication range for the signal on the wireless communication link; and dynamically introducing an additional level of signal diversity into the wireless communication link in response to determining that the effective signal strength of the signal is insufficient, to generate additional decorrelated signals corresponding to the signal on the wireless communication link that provides a representation of the content of the signal to a receiver.

28. A method according to claim 27, wherein the wireless communication link comprises an uplink communication link to a communication station.

29. A method according to claim 27, wherein the level of signal diversity comprises diversity in one or more of space, time, frequency, or code.

30. A method according to claim 27, wherein determining that the effective signal strength of the signal is insufficient further comprises measuring one or more signal quality characteristics selected from the group consisting of: a receive signal strength, a signal to noise ratio (SNR), a bit error rate (BER), a frame error rate (FER), signal to noise and interference ratio (SINR), or a carrier to interference ratio (CIR).

31. A method according to claim 27, wherein introducing an additional level of diversity comprises:

communicating on a first channel of the wireless communication link;

determining whether a second channel is available on the wireless communication link to support repetition coding; and invoking repetition coding to transmit a repetition coded signal on the first channel and on the second channel of the wireless communication link to provide channel diversity.

* * * * *